United States Patent [19]

Li

[11] Patent Number: 4,852,091

[45] Date of Patent: Jul. 25, 1989

[54] HIGH CAPACITY COMMUNICATION SYSTEM UTILIZING OR-TYPE CHANNELS

[75] Inventor: Shuo-Yen R. Li, Gillette, N.J.

[73] Assignee: Bell Communications Research, Inc., Livingston, N.J.

[21] Appl. No.: 184,331

[22] Filed: Apr. 21, 1988

[51] Int. Cl.[4] .............................................. H04J 3/02
[52] U.S. Cl. ........................................ 370/85; 375/36; 340/825.5
[58] Field of Search ................................ 370/85, 88, 94; 340/825.5, 825.51; 375/36

[56] References Cited

U.S. PATENT DOCUMENTS

| | | | |
|---|---|---|---|
| 3,796,992 | 3/1974 | Nakamura et al. | 340/147 |
| 4,281,380 | 7/1981 | DeMesa III et al. | 364/200 |
| 4,359,731 | 11/1982 | Beauford et al. | 340/825.51 |
| 4,376,278 | 3/1983 | Jacobsthal | 340/825.5 |
| 4,383,314 | 5/1983 | Tam | 370/88 |
| 4,470,110 | 9/1984 | Chiarottino et al. | 364/200 |
| 4,476,467 | 10/1984 | Terwilliger et al. | 340/825.5 |
| 4,481,626 | 11/1984 | Boggs et al. | 379/85 |
| 4,536,877 | 8/1985 | Livingston et al. | 370/85 |
| 4,584,679 | 4/1986 | Livingston et al. | 370/85 |
| 4,586,175 | 4/1986 | Bedard et al. | 370/85 |
| 4,768,189 | 8/1988 | Gopinath | 370/85 |

FOREIGN PATENT DOCUMENTS 1365838  9/1974  United Kingdom .

OTHER PUBLICATIONS

Reference entitled "Performance Comparison of Explicit and Implicit Token-Passing Networks", published by Butterworth & Co. Ltd., 1987, vol. 10, No. 2, Apr. 1987, Computer Communications, pp. 59-68.

Primary Examiner—Douglas W. Olms
Attorney, Agent, or Firm—James W. Falk; John T. Peoples

[57] ABSTRACT

A methodology is disclosed for effecting contention-free communication over a plurality of OR-type lines interconnecting numerous synchronized stations. In broad terms, each station having a message to transmit executes a prescribed encoding/decoding algorithm. Each station also monitors the states of all the lines, collectively rather than individually, and prepares a station response each bit interval in correspondence to the collective states. During each bit interval, message candidates corresponding to the set of messages are identified and then assigned to selected ones of the lines. Based on the assignment, logic signals are propagated from each station over one of the assigned lines. By monitoring, each station senses the composite line signal on each of the lines and then generates new message candidates for the next bit interval. The processing algorithm repeats these steps through all bit intervals and the candidates remaining at the completion of the process yield successfully transmitted messages.

11 Claims, 14 Drawing Sheets

| STATION | FRAME BITS |   |   |   |   |   |   |   |   |   | DECIMAL VALUE |
|---------|---|---|---|---|---|---|---|---|---|---|---------|
|         | 1 | 2 | 3 | 4 | 5 | 6 | 7 | 8 | 9 | 10 |        |
| $S_1$ | 0 | 0 | 0 | 0 | 1 | 0 | 0 | 0 | 1 | 0 | 34 |
| $S_2$ | 0 | 0 | 0 | 0 | 1 | 1 | 1 | 0 | 0 | 0 | 56 |
| $S_3$ | 0 | 1 | 1 | 0 | 0 | 0 | 0 | 0 | 1 | 0 | 386 |
| $S_4$ | 0 | 1 | 1 | 0 | 0 | 1 | 0 | 0 | 1 | 0 | 402 |
| $S_5$ | 0 | 1 | 1 | 0 | 1 | 1 | 0 | 1 | 1 | 0 | 438 |
| $S_6$ | 1 | 0 | 1 | 0 | 0 | 0 | 1 | 0 | 1 | 0 | 650 |
| $S_7$ | 1 | 0 | 1 | 0 | 0 | 0 | 1 | 1 | 0 | 0 | 652 |
| $S_8$ | 1 | 0 | 1 | 1 | 0 | 0 | 0 | 1 | 0 | 1 | 709 |
| $S_9$ | 1 | 0 | 1 | 1 | 0 | 1 | 1 | 1 | 0 | 1 | 733 |

BIT NUMBER = 3
NUMBER OF COLLECTIONS = 0

FIG. 5
BIT NUMBER = 4
NUMBER OF COLLECTIONS = 3

| PREFIXES | WRITE "1" ON LINE | READ | COLLECTION |
|---|---|---|---|
| $C_{03}$ {000} | 0 | Y | $C_{04}$ {34, 56} |
|  | 1 | N |  |
| $C_{13}$ {011} | 2 | Y | $C_{14}$ {386, 402, 438} |
|  | 3 | N |  |
| $C_{23}$ {101} | 4 | Y | $C_{24}$ {650, 652} |
|  | 5 | Y | $C_{34}$ {709, 733} |
|  | 6 | - |  |
|  | 7 | - |  |

FIG. 6
BIT NUMBER = 5
NUMBER OF COLLECTIONS = 4

| PREFIXES | WRITE "1" ON LINE | READ | COLLECTION |
|---|---|---|---|
| $C_{04}$ {0000} | 0 | N |  |
|  | 1 | Y | $C_{05}$ {34, 56} |
| $C_{14}$ {0110} | 2 | Y | $C_{15}$ {386, 402} |
|  | 3 | Y | $C_{25}$ {438} |
| $C_{24}$ {1010} | 4 | Y | $C_{35}$ {650, 652} |
|  | 5 | N |  |
| $C_{34}$ {1011} | 6 | Y | $C_{45}$ {709, 733} |
|  | 7 | N |  |

FIG. 7
BIT NUMBER = 6
NUMBER OF COLLECTIONS = 5

| PREFIXES | WRITE "1" ON LINE | READ | COLLECTION |
|---|---|---|---|
| $C_{05}$ {00001} | 0 | Y | $C_{06}$ { 56 } |
| $C_{15}$ {01100} | 1 | Y | $C_{16}$ { 402 } |
| $C_{25}$ {01101} | 2 | Y | $C_{26}$ { 438 } |
| $C_{35}$ {10100} | 3 | N | $C_{36}$ { 650, 652 } |
| $C_{45}$ {10110} | 4 | Y | $C_{46}$ { 733 } |
| $P_5$ (5) { NULL, NULL, NULL, NULL, NULL } | 5, 6, 7 | N, N, N | |

$P_6$

FIG. 8
BIT NUMBER = 7
NUMBER OF COLLECTIONS = 5

| PREFIXES | WRITE "1" ON LINE | READ | COLLECTION |
|---|---|---|---|
| $C_{06}$ {000011} | 0 | Y | $C_{07}$ { 56 } |
| $C_{16}$ {011001} | 1 | N | $C_{17}$ { 402 } |
| $C_{26}$ {011011} | 2 | N | $C_{27}$ { 438 } |
| $C_{36}$ {101000} | 3 | Y | $C_{37}$ { 650, 652 } |
| $C_{46}$ {101101} | 4 | Y | $C_{47}$ { 733 } |
| $P_6$ (5) { 000010 (34), 011000 (386), 011010 NULL, 101100 (709) } | 5, 6, 7 | Y, N, Y | $C_{57}$ { 34 }; $C_{67}$ { 386, 709 } |

BIT NUMBER = 8
NUMBER OF COLLECTIONS = 7

| PREFIXES | WRITE "1" ON LINE | READ | COLLECTION |
|---|---|---|---|
| $C_{07}$ {0000111} | 0 / 1 ──── 0 | N | $C_{08}$ { 56 } |
| $C_{17}$ {0110010} | ──── 1 | N | $C_{18}$ { 402 } |
| $C_{27}$ {0110110} | ──── 2 | Y | $C_{28}$ { 438 } |
| $C_{37}$ {1010001} | ──── 3 | Y | $C_{38}$ { 652 } |
| $C_{47}$ {1011011} | ──── 4 | Y | $C_{48}$ { 733 } |

$C_{57}$ (4) $\begin{Bmatrix} 0000100 & (34) \\ 0110001 & \\ NULL & \\ 1011001 & \end{Bmatrix}$ ──── 5    N    $C_{58}$ { 34 }

$C_{67}$ (9) $\begin{Bmatrix} 0110000 & (386) \\ 0110101 & \\ 1011000 & (709) \\ NULL & \\ NULL & \\ NULL & \\ NULL & \\ NULL & \\ NULL & \end{Bmatrix}$ ──── 6    Y    $C_{68}$ { 709 }

$P_7$ (18) $\begin{Bmatrix} 0000110 \\ NULL \\ NULL \\ 1010000 \\ 1011010 \\ NULL \\ \vdots \\ NULL \end{Bmatrix}$ ──── 7    N $P_8$ $\begin{Bmatrix} 650 \\ 386 \end{Bmatrix}$

FIG. 10

BIT NUMBER = 9
NUMBER OF COLLECTIONS = 7

| PREFIXES | WRITE "1" ON LINE | READ | COLLECTION |
|---|---|---|---|
| $C_{08}$ {00001110} $\begin{smallmatrix}0\\1\end{smallmatrix}$ | 0 | N | $C_{09}$ { 56 } |
| $C_{18}$ {01100100} | 1 | Y | $C_{19}$ { 402 } |
| $C_{28}$ {01101101} | 2 | Y | $C_{29}$ { 438 } |
| $C_{38}$ {10100011} | 3 | N | $C_{39}$ { 652 } |
| $C_{48}$ {10110111} | 4 | N | $C_{49}$ { 733 } |
| $C_{58}$ (4) $\begin{Bmatrix}00001000\ (34)\\01100010\\\text{NULL}\\10110010\end{Bmatrix}$ | 5 | Y | $C_{59}$ { 34 } |
| $C_{68}$ (9) $\begin{Bmatrix}01100001\\01101011\\10110001\\\text{NULL}\\\text{NULL}\\\text{NULL}\\\text{NULL}\\\text{NULL}\\\text{NULL}\end{Bmatrix}$ | 6 | N | $C_{69}$ { 709 } |
| $P_8$ (18) $\begin{Bmatrix}\text{NULL}\\\text{NULL}\\01101100\\10100010\ (650)\\10110110\\\text{NULL}\\\text{NULL}\\\text{NULL}\\\text{NULL}\\01100000\\01101010\ (386)\\10110000\\\text{NULL}\\\vdots\\\text{NULL}\end{Bmatrix}$ | 7 | Y | $C_{79}$ $\begin{Bmatrix}650\\386\end{Bmatrix}$ |

FIG. 11

BIT NUMBER = 10
NUMBER OF COLLECTIONS = 8

| PREFIXES | WRITE "1" ON LINE | READ | COLLECTION |
|---|---|---|---|
| $C_{09}$ {000011100} $\genfrac{}{}{0pt}{}{0}{1}$ | 0 | N | $C_0$ { 56 } |
| $C_{19}$ {011001001} | 1 | N | $C_1$ { 402 } |
| $C_{29}$ {011011011} | 2 | N | $C_2$ { 438 } |
| $C_{39}$ {101000110} | 3 | N | $C_3$ { 652 } |
| $C_{49}$ {101101110} | 4 | Y | $C_4$ { 733 } |
| $C_{59}$ (4) $\begin{Bmatrix} 000010001 \\ 011000101 \\ \text{NULL} \\ 101100101 \end{Bmatrix}$ (34) | 5 | N | $C_5$ { 34 } |
| $C_{69}$ (9) $\begin{Bmatrix} 011000010 \\ 011010110 \\ 101100010 \\ \text{NULL} \\ \text{NULL} \\ \text{NULL} \\ \text{NULL} \\ \text{NULL} \\ \text{NULL} \end{Bmatrix}$ (709) | 6 | Y | $C_6$ { 709 } |
| $C_{79}$ (36) $\begin{Bmatrix} 4 \text{ NULL'S} \\ 011011000 \\ 011011001 \\ 101000100 \\ 101000101 \\ 101101100 \\ 101101101 \\ 8 \text{ NULL'S} \\ 011000000 \\ 011000001 \\ 011010100 \\ 011010101 \\ 101100000 \\ 101100001 \\ 12 \text{ NULL'S} \end{Bmatrix}$ (650) (386) | 7 | N | $C_7$ $\begin{Bmatrix} 650 \\ 386 \end{Bmatrix}$ |

FIG. 12

BIT INTERVAL 11 = BIT INTERVAL 1 OF NEXT FRAME
NUMBER OF COLLECTIONS = 8

| | ASSIGN TO | LINE | READ | COLLECTION |
|---|---|---|---|---|
| $C_0$ {0000111000} (56) | | 0 | Y | $C_5$ {34} |
| $C_1$ {0110010010} (402) | | 1 | N | |
| $C_2$ {0110110110} (438) | | 2 | N | $C_6$ {709} |
| $C_3$ {1010001100} (652) | | 3 | N | |
| $C_4$ {1011011101} (733) | | 4 | Y | $C_7$ {650, 386} |
| | | 5 | N | |
| | | 6 | N | |
| | | 7 | N | |

$C_5$ (4)
$\begin{Bmatrix} 0000100010 \\ 0110001010 \\ \text{NULL} \\ 1011001010 \end{Bmatrix}$ 
→ L0
  X  —
→ L0
  X  —

$C_6$ (9)
$\begin{Bmatrix} 0110000101 \\ 0110101101 \\ 1011000101 \\ \text{NULL} \\ \text{NULL} \\ \text{NULL} \\ \text{NULL} \\ \text{NULL} \\ \text{NULL} \end{Bmatrix}$ (709)
→ L1
→ L2
  X  —
→ L1
→ L2
  X  —
→ L1
→ L2
  X  —

$C_7$ (36)
$\begin{Bmatrix} 4 \text{ NULL'S} \\ 0110110000 \\ 0110110010 \\ 1010001000 \\ 1010001010 \\ 1011011000 \\ 1011011010 \\ 8 \text{ NULL'S} \\ 0110000000 \\ 0110000010 \\ 0110101000 \\ 0110101010 \\ 1011000000 \\ 1011000010 \\ 12 \text{ NULL'S} \end{Bmatrix}$
⋮
→ L7
  X  —
→ L3
(650) → L4
→ L5
→ L6
⋮
→ L3
(386) → L4
→ L5
→ L6
→ L7
  X  —
⋮

FIG. 13
BIT INTERVAL 12 = BIT NUMBER 2 OF NEXT FRAME

| | | ASSIGN TO | | LINE | READ | COLLECTION | |
|---|---|---|---|---|---|---|---|
| $C_5$ (2) | { 0000100010 <br> NULL } | ⟶ <br> X | L0 <br> - | 0 | Y | $C_5$ | {34} |
| | | | | 1 | Y | $C_6$ | {709} |
| $C_6$ (3) | { 1011000101 <br> NULL <br> NULL } | ⟶ <br> ⟶ <br> X | L1 <br> L2 <br> - | 2 | N | | |
| | | | | 3 | N | | |
| $C_7$ (6) | { NULL <br> 1010001010 <br> NULL <br> 0110000010 <br> NULL <br> NULL } | ⟶ <br> ⟶ <br> ⟶ <br> ⟶ <br> ⟶ <br> X | L3 <br> L4 <br> L5 <br> L6 <br> L7 <br> - | 4 | Y | $C_7$ | {650} |
| | | | | 5 | N | | |
| | | | | 6 | Y | DROP | {386} |
| | | | | 7 | N | | |

FIG. 14
PREFIXES DROPPED

BIT NUMBER = 9  $\left\{\begin{array}{l}011001000\\011011010\\000010000\\011000100\\101100100\end{array}\right\}$ BIT NUMBER = 10  $\left\{\begin{array}{l}1011011100\\0110000100\\0110101100\\1011000100\end{array}\right\}$ BIT INTERVAL = 11  $\left\{\begin{array}{l}0110000101\\0110101101\end{array}\right\}$

BIT INTERVAL = 12  $\{0110000010\}$

FIG. 18 DECODING PROCEDURE IN THE BIT INTERVAL t ($\log_2 L \leq t \leq F + \log_2 L - 1$)

HIGH CAPACITY COMMUNICATION SYSTEM UTILIZING OR-TYPE CHANNELS

CROSS-REFERENCE TO RELATED APPLICATION

The following U.S. Application, which is assigned to the same assignee as the instant application and which is filed concurrently therewith, contains related subject matter:

"High Capacity Communication System Using Collision-type Channels", Ser. No. 184,509, B. Gopinath and S.-Y. R. Li.

FIELD OF THE INVENTION

This invention relates generally to a multiple access communication network wherein a plurality of transmission channels interconect numerous distributed stations and, more specifically, to a methodology and associated systems for effecting high capacity and low delay interstation communication over OR-type channels.

BACKGROUND OF THE INVENTION

A conventional configuration for a communication network is one wherein a plurality of stations are interconnected by a common transmission medium or channel, and messages are exchanged among the stations on a time-shared basis over the channel. A so-called conflict situaton arises whenever multiple stations require use of the same channel at the same instant.

For these contention periods, methods and concomitant arrangements exist for dealing with conflicts and these vary in complexity from simple, fixed priority techniques to sophisticated code division multiple access procedures. When the stations are arranged to sense a conflict on the channel, the type of communication network is referred to as a Carrier Sensed Multiple Access (CSMA) network.

As a specific example illustrative of the art for arbitrating contentions in a CSMA environment, the CSMA with Collision Detection (CSMA/CD) media access method is briefly described. (The CSMA/CD method is discussed in detail in the text entitled "Carrier Sensed Multiple Access with Collision Detection (CSMA/CD) Access Method and Physical Layer Specifications", published by The institute of Electrical and Electronic Engineers, Inc. in 1985). To transmit, each station monitors for a quiet period on the channel by detecting that no other stations are transmitting, and then emits the intended message in bit-serial form. If, after commencing transmission, the message collides with that of other stations, then each transmitting station intentionally sends additional bits to ensure propagation of the collision throughout the system. The stations then deactivate for a random time period, called the backoff time, before attempting to transmit again. This process continues until only a single message propagates collision-free over the channel. However, as is quite discernible even from this brief overview, this technique is somewhat inefficient due to station deactivation during the backoff periods and the randon nature of the retry process. From another viewpoint, if a normalized efficiency per transmission period is defined as the ratio of the time utilized for information-bearing message transfer to the total time period, then the efficiency is less than unity for conventional contention resolving systems.

Other, more specialized techniques have been disclosed to deal with contention on a more deterministic basis. Representative of these techniques is the disclosure in Great Britain Pat. No. 1,365,838. In this reference, the particular system considered is one in which a number of data handling devices (slave stations) are in communication with a common controller (master station) over a bus and any one of the devices may require service from the controller at any given time. At system initialization, each data handling device is assigned a fixed interrupt number indicative of the device address. The controller solicits interrupt requests by transmitting a coded message. Each device, if requesting use of the bus, responds by serially transmitting its interrupt number simultaneously with other devices. Then each device compares the bus content bit-by-bit and then either terminates or continues its transmission according to the results of the comparison. With such a technique, the time required to resolve a contention is fixed by the number of bits assigned to the interrupt numbers. However, even though this time is deterministic, there is still a period in which no actual information-bearing messages may be transmitted and the normalized efficiency is less than one.

As suggested by the above discussion, there have been many protocols introduced for dealing with conflicts in CSMA networks, and there have been numerous studies of their performance. With an offered load equal to the channel capacity, the throughput efficiency of all previous protocols is no more than 70 percent. Moreover, when the offered load exceeds a certain level in a given system, an overload condition referred to as "jamming" occurs, and the efficiency drops off, often significantly, above this threshold level.

None of the conventional techniques disclose or suggest a methodology for always achieving the optimum normalized throughput efficiency as defined above. Moreover, none of the conventional methods suggest the utilization of more than one channel or bus to resolve or even eliminate contention situations.

SUMMARY OF THE INVENTION

The above disadvantages and other limitations of conventional contention resolution methods and arrangements are obviated, in accordance with the present invention, by interconnecting all stations with a plurality of OR-type channels or lines and by arranging each of the stations to monitor the states of all lines, collectively rather than individually, and appropriately determine the station response each bit interval in correspondence to the collective states.

Briefly, for station messages partitioned into a number of bit intervals, the general method for a given bit interval commences by identifying candidate messages and assigning each of the candidates to selected ones of the lines. A candidate message is defined by the prefix or initial bit positions of the message, that is, only the revealed portion of the message up to the given bit interval under consideration. An encoding algorithm for this dynamic allocation process is used to effect the identification and assignment steps. In response to these initial steps, a logic signal emanates from each of the active stations according to the logic level of the bit in the given interval. The logic signal from each station is associated with only one of the selected lines. Following the signal propagation, each station monitors the composite signal levels on all the lines. This composite signal serves as input to the algorithm so that new collections for the next succeeding bit interval may be prepared. The candidates existing after the last bit interval has been processed determine the transmitted messages.

A seminal feature of the communication system in accordance with the invention is that its throughput achieves 100 percent of the combined channel capacity in the sense of the following two properties. If L denotes the number of channels or parallel lines, then:

(1) if there are at least L contending messages, then at least L are successfully transmitted;

(2) if there are less than L contending messages, then all are successfully transmitted.

The organization and operation of the invention will be better understood from a consideration of the detailed description of the illustrative embodiment thereof, which follow, when taken in conjunction with the accompanying drawing.

BRIEF DESCRIPTION OF THE DRAWING

FIG. 2 depicts an exemplary set of frames prepared as candidate messages for propagation over the plurality of channels shown in FIG. 1;

FIGS. 4–11 summarize, for an illustrative example, the assignment of the prefixes to the various communication lines during consecutive bit intervals in the opening phase of the transmission process in accordance with the present invention;

FIG. 12 summarizes the assignment of candidate messages to the various lines during the first bit interval in the closing phase of the illustrative example;

FIGS. 13 summarizes the assignment of candidate messages to the various lines during the last bit interval in the closing phase of the the illustrative example;

FIGS. 14 summarizes the prefixes tested and dropped during illustrative bit intervals in the transmission process;

DETAILED DESCRIPTION

Figure 1:
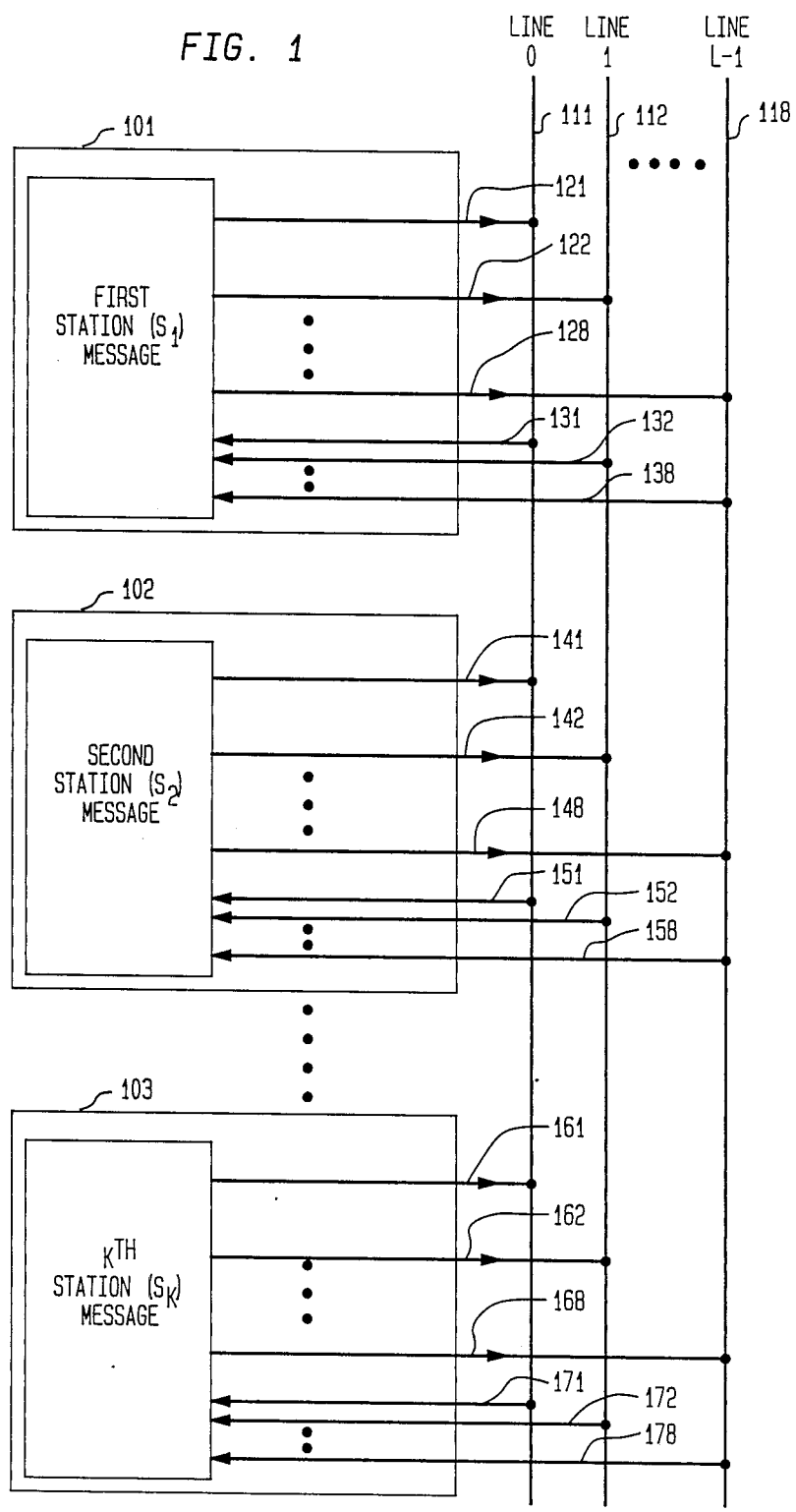
FIG. 1 is a representation of a multiple access communication system wherein a plurality of OR-type channels interconnect numerous, geographically-disbursed stations.

An illustrative embodiment in accordance with the present invention may be represented in general form by the block diagram of FIG. 1. However, in order to describe the principles in an expeditious manner, a specific example is first elucidated. This also aids in introducing terminology and notation. Hereafter, an OR-type channel will be simply called a line. For a general background on how the lines may be arranged to effect parallel, OR-type communication, the article entitled "Performance Comparison of Explicit and Implicit Token-Passing Networks," by O. C. Ibe as published in *Performance*, Vol. 10, No. 2, April, 1987 is incorporated herein by reference.

Figures 2, 4:
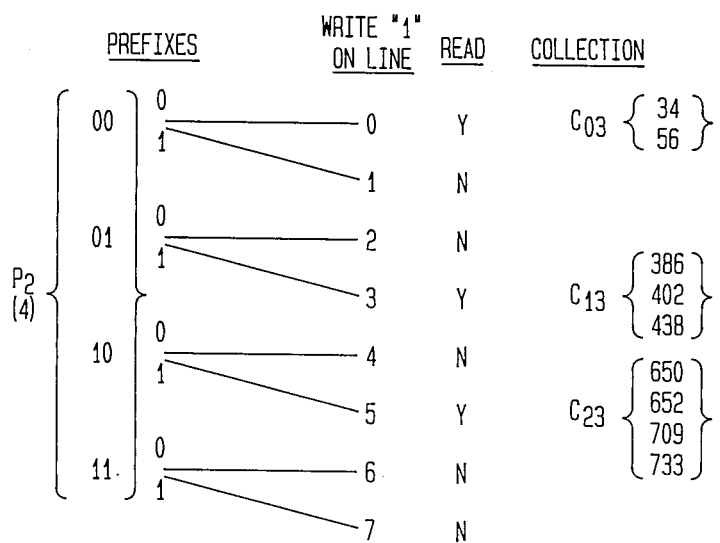

With reference to FIG. 1, it is supposed that nine synchronized stations $S_1$–$S_9$ are coupled to eight lines 111–118; $S_1$ corresponds to element 101 and transmits on lines 121–128 and receives on lines 131–138, whereas $S_9$ ($S_k$ generally) corresponds to element 103 with associated transmit and receive lines. In the example, each station communicates via ten-bit message frames; an exemplary set of frames for the station is shown in FIG. 2. Generally, the frame size is designated by F and the number of lines is given by L.

To demonstrate concisely the message transmission process, the messages shown in FIG. 2 are first arranged in ascending order according to their binary values and then the stations are assigned accordingly. This simplifies the description but is not required in general. The decimal value corresponding to the binary representation of each of the frames is also given in FIG. 2. A short hand notation is to refer to a frame message by its decimal equivalent value.

Figure 3:
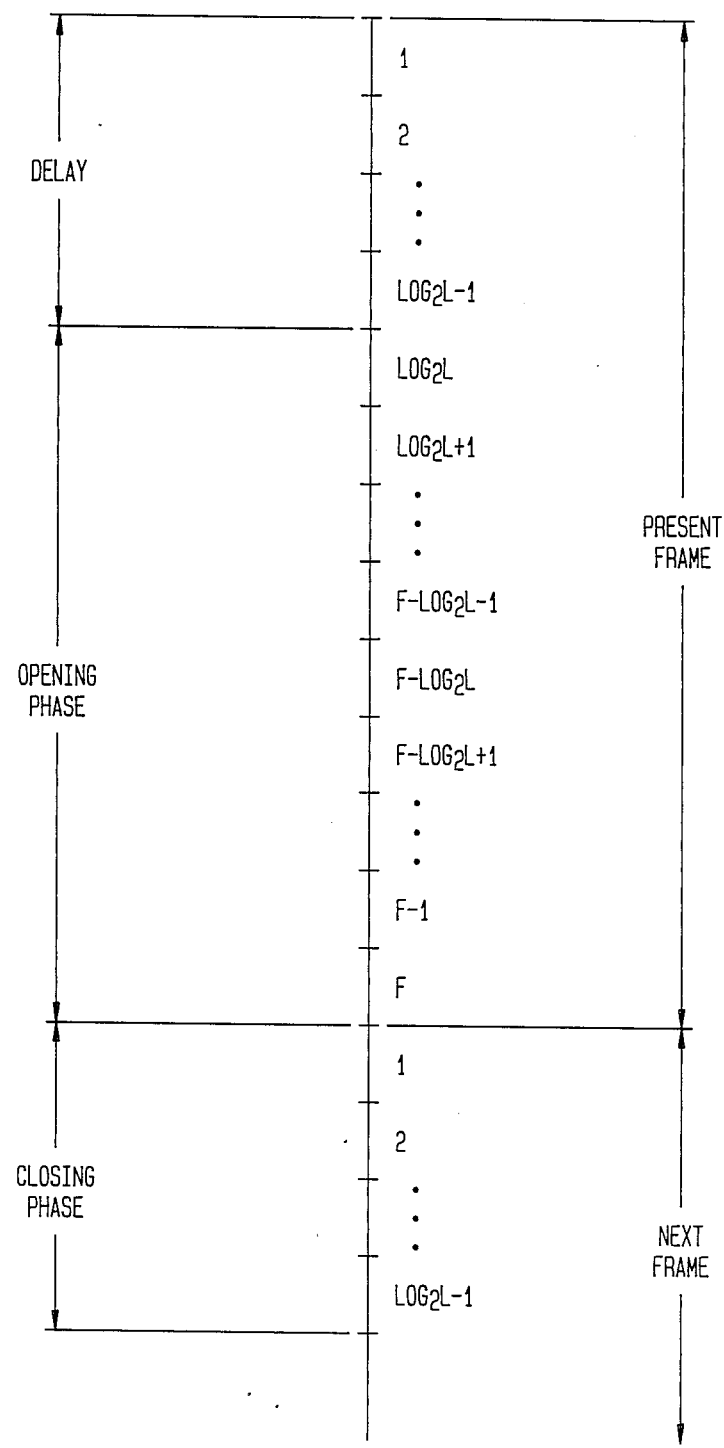
FIG. 3 indicates how both the opening and closing phases overlay on the present and next frame messages in order to minimize system throughput delay.

Broadly, the transmission process comprises two phases, designated the opening phase and closing phase, respectively. The opening phase encompasses all F bits in a frame. The closing phase requires $\log_2 L - 1$ additional bit positions to resolve fully the transmitted messages. Thus, the closing phase of a frame overlaps with the initial $\log_2 L - 1$ bit positions of the opening phase of the next frame. This is depicted in FIG. 3 and implies a system throughput delay of only $\log_2 L - 1$ bits for serially transmitted frames.

OPENING PHASE

In the opening phase, the primary goals are thatof (i) identifying a number of disjoint sets or collections of candidate messages such that each collection contains at least one message, and (ii) eliminating some non-message candidates. In achieving these goals, it is important that the number of collections be as large as possible but no more than the number of lines L, and the size of each collection should be controlled. Moreover, when there are less than L collections, the number of candidates outside these collections that are not yet eliminated should be as small as possible. These latter candidates are grouped into a special collection called a "pool".

Although the messages are initially presumed to be completely stored in stations $S_1$–$S_9$, the messages are transmitted or revealed on the lines one bit position at a time. Thus, a candidate message at each bit interval is defined as a partial message, designated as "prefix". Therefore, each collection of candidates is associated with a prefix until all bits are revealed, and the size of each prefix depends on the bit position under consideration. Initially, all messages are in the pool and the first prefix length requiring a decision process is, generally, $\log_2 L$ bits. The decision methodology is discussed shortly. During the time periods associated with bit positions up to $\log_2 L$, no decisions with respect to the pool of candidate messages are performed; rather, only the pool is filled with candidates. During the remaining time positions in the opening phase, corresponding to bit position $\log_2 L$ up through bit position F, certain encoding activities, such as WRITE and then immediate READ activities as discussed shortly, occur within each bit propagation interval.

Applying these principles to the example, with reference to FIG. 4, a summary of the state of the system is presented after the first three bits (here, $\log_2 L = \log_2$ 8=3) have propagated. As depicted, the pool prior to the transmission of the third bit is $P_2$ and it is composed of prefixes 00, 01, 10, and 11. Two-bit prefix 00 engenders three-bit prefixes 000 and 001; similarly prefix 01 gives rise to prefixes 010 and 011; and so forth. If a station message has a prefix of 000, then the station WRITES a logic 1 signal on line 111 of FIG. 1 but redefined as Line 0 in FIG. 4; similarly, a station WRITES a logic 1 signal on Line 1 (line 112) if it has a message with the 001 prefix; and so forth. This is depicted by the PREFIXES column of FIG. 4. Basically, since there are $2^{10}=1024$ possible message values and eight lines available for propagation, 128 messages are initially allocated to each line.

Since an OR line system is presumed, one or more logic 1 signals on any particular line produces a composite logic 1 signal level on that line. During the READ interval, as also depicted in FIG. 4, each station monitors the composite state of each line and determines whether a logic 0 or a logic 1 appears on each line. A 'Y' in the READ column means a logic 1 signal is on the line, whereas a 'N' indicates a logic 0 state. Lines 0, 3 and 5 have logic 1 states for this example. Line 0, carries the prefix of messages '34' and '56'; Line 3 captured the prefix of messages '386', '402' and '438'; and Line 5 propagates the prefix for messages 1 650', '652', '709' and '733'. Finally, as shown on FIG. 4, the collections resulting from the encoding process are summarized. In particular: collection $C_{03}$ is composed of the prefix 000; collection $C_{13}$ has prefix 011; and collection $C_{23}$ has prefix 101.

These collections are produced as a result of the detected logic 1 level on the corresponding Lines 0, 3 and 5, respectively.

Next, attention is focussed on the fourth bit propagation interval, and a summary of the status of the system is shown in FIG. 5. At the commencement of this bit interval, the three collections identified as a result of the detection process during the last bit interval are available for further refinement. Thus, prefix 000 of the first collection engenders the two prefixes 0000 and 0001. If any station has a message with the prefix 0000, the station writes a logic 1 on Line 0. Similarly, any station having a message with prefix 0001 writes a logic 1 on Line 1. The other two collections of prefixes are processed in a similar manner simultaneously with the first collection. It should be noted that the collections may be assigned to different lines than the lines upon which the collections were originally detected. The algorithm to effect this reassignment is known by all stations and will be discussed shortly.

Following the concurrent WRITE operations, the READ part of the cycle again commences. As summarized in FIG. 5, Lines 0, 2, 4 and 5 have captured messages, giving rise to four new collections. The collections are defined in terms of the prefixes that fostered them, namely, prefixes 0000, 0110, 1010 and 1011. Comparison of these prefixes to the first four bit positions of FIG. 2 indicates that messages '709' and '733' have been separated from messages '650' of the previous collection, which had prefix 101. Now, the prefix of messages '709' and '733' is in a fourth collection, and the other two remain grouped in the third collection. The first two collections, at this juncture, have not had any messages "separated out." It should also be noted that Lines 6 and 7 had no messages assigned to them because the number of collections at the start of the fourth bit interval was less than one-half the number of lines, and the collections were only split in half.

FIG. 6 summarizes the unfolding process during the propagation of the fifth bit. As the description has established, prefix 0000 from the last detected bit position gives rise to prefixes 00000 and 00001. The other prefixes fostered by the prior collections are also depicted on FIG. 6. Moreover, the association of the prefixes with their assigned lines is also identified. Because there are four collections at the beginning of the bit propagation interval, and each is split into two parts, all eight lines are utilized at this stage of the process. Any station with a message having the corresponding prefix places a logic 1 on the appropriate line and then monitors for the status of all the lines. At the end of the monitoring process, five collections have been identified. These collections have the prefixes 00001, 01100, 01101, 10100 and 10110, respectively. The added collection results from separating out messages '386' and '402' from message '438', as evidenced by comparing the prefixes determined at this stage of the detection process with the contents of the frame messages of FIG. 2.

The next stage of the process is summarized in FIG. 7. However, since the number of collections is now more than half the number of lines there is a transition in the manner in which collections are assigned to lines. In addition, a pool of untested candidate messages is now brought into the process. For the bit position under consideration, the pool is a "dummy" pool in the sense that only NULL messages are assigned to the pool. The detailed reason for this will be explained shortly; basically, the NULL messages are "place-takers" in that they reserve places in the selection process to be discussed shortly.

Until the function theoretic basis is described later in this section, it is difficult to fully elucidate the procesing during the remaining bit intervals. However, it is possible to trace the path of a particular message and thereby provide a motivational heuristic basis leading to the theoretic basis. The message chosen to be traced is message '650' (1010001010) transmitted by station $S_6$. From FIG. 7 it may readily be deduced that message '650' is in collection $C_{35}$ at the start of the sixth bit interval. Since the number of collections is more than half the number of lines, each collection is assigned to only one line. Thus collection $C_{05}$ is assigned to Line 0, collection $C_{15}$ is assigned to Line 1, and so on. Finally, the pool is assigned to the remaining lines, namely, Lines 5, 6 and 7.

The prefix 10100 in collection $C_{35}$ engenders the two prefixes 101000 and 101001. In order to distinguish between these two prefixes, only those messages having the latter prefix write a logic 1 on the assigned line, namely, Line 3. In this case, no message has a prefix 101001, so during the READ interval, this line yields a 'N'. Since it is already known that there is a message with prefix 10100 and Line 3 yielded a 'N', this implies that there is a collection consisting of the prefix 101000 at the end of the sixth bit interval. (A case where a logic 1 is written on a line is exemplified by collection $C_{05}$ on Line 0. Message '56' has prefix 000011, so a logic 1 is written on Line 0 during the WRITE phase of bit interval 6. It is also possible that some prefixes neither belong to any collection nor are eliminated. Such prefixes are lumped into the special collection or pool, which is denoted a $P_6$ at the end of the sixth bit interval. For example, the prefix 000010 from collection $C_{05}$ is connected to Line 0 via a dotted line, even though messages with this prefix do not write a logic 1 on Line 0. This only serves to indicate that, had Line 0 yielded an 'N', it would have determined a collection that included 000010 instead of 000011 on Line 0. However, Line 0 yielded a 'Y', so message '34', with prefix 00010, becomes part of pool $P_6$ for the next bit interval.)

At the beginning of the seventh bit interval, the prefix 101000 engenders the prefixes 1010000 and 1010001, which are both assigned to Line 3, as depicted by FIG. 8. The resultant detection process during this bit interval causes the prefix 1010001, along with others, to be assigned to collection $C_{37}$.

Continuing in this manner, the prefix 10100010 is assigned to pool $P_8$, the prefix 101000101 to collection $C_{79}$, and the message 1010001010 to $C_7 (=C_{7,10})$. This process is summarized in FIGS. 9, 10 and 11.

In summary, the path of the message '650' during the opening phase traces through: $P_2$, Line 5; $C_{23}$, Line 4; $C_{24}$, Line 4; $C_{35}$, (Line 3); $C_{36}$, Line 3; $C_{37}$, (Line 3); $P_8$, Line 7; $C_{79}$, (Line 7); $C_7$. (Lines in parenthesis indicate the Line is not actually written on by the station).

FUNCTION THEORETIC BASIS

A. Encoding

In the example, the notation $C_{03}, C_{13}, C_{23}, \ldots, C_{09}, C_{19}, \ldots C_{79}, C_0, C_1, \ldots, C_7$ was used to designate collections detected during associated bit intervals. The generalization of this notation is defined by $C_{jk}$, $0 \leq j \leq L-1$, $\log_2 L \leq k \leq F$. In particular, $C_{jF}$ is abbreviated as $C_j$. Also in the example it was alluded to that the size of each collection at the end of a bit interval should be under control. Precisely that means that collection $C_{jk}$ can not have its size larger than $a_j$, which is defined by the following recursion:

$$a_0 = a_1 = \ldots = a_{L/2} = 1,$$

and $$a_j = \lceil \frac{2}{L-j} (a_0 + \ldots + a_{j-1}) \rceil, \frac{L}{2} < j < L,$$

where $\lceil \rceil$ is the "next largest integer" operator. For instance, in the example for $L=8$, the $a_j$'s are:
$$a_0 = a_1 = \ldots a_4 = 1$$

and $a_5 = 4$, $a_6 = 9$ and $a_7 = 36$.

Those candidates outside the collections $C_{0k}, C_{1k}$, and so forth that are not yet eliminated form the pool of candidates. The pool at the end of the bit interval k, denoted as $P_k$, consists of a number (possibly zero) of prefixes of length k. Initially when $k = \log_2 L - 1$, the pool consists of all the $L/2$ possible prefixes of the length k. Thereafter in the opening phase, i.e., when $\log_2 L \leq k \leq F$, the size of the pool is bounded by
(a) 0, if the number of collections $\leq L/2$,
(b) $a_0 + \ldots + a_{i-1}$, if the number of collections is i, where $L/2 < i < L$.
The pool collection is ignored as soon as L collections are identified.

To aid the description, the $a_j$'s are grouped to define a so-called status vector:

$$<a_0, a_1, \ldots, a_{i-1}; a_0 + \ldots + a_{i-1}>.$$

Generally then there are i collections whose sizes are respectively bounded by $a_0, a_1, \ldots, a_{i-1}$ (the first i entries in the vector). The size of the pool is bounded by $a_0 + \ldots + a_{i-1} = b_i$ (the last entry in the vector). By padding collections with NULL candidates, it may be assumed that the sizes of collections are exactly $a_0, a_1, \ldots, a_{i-1}$, and that the size of the pool is exactly $b_i$. When the number of collections reaches L, the pool is ignored and therefore the status vector can be truncated to $<a_0, a_1, \ldots, a_{L-1}; >$.

For instance, for the example with $L=8$, the status vector at the end of any bit position in the opening phase is one of the following:

| | |
|---|---|
| 0 collections (i = 0) | $<;4>$ |
| 1 collection (i = 1) | $<1;0>$ |
| 2 collections (i = 2) | $<1,1;0>$ |
| 3 collections (i = 3) | $<1,1,1;0>$ |
| 4 collections (i = 4) | $<1,1,1,1;0>$ |
| 5 collections (i = 5) | $<1,1,1,1,1;5>$ |
| 6 collections (i = 6) | $<1,1,1,1,1,4;9>$ |
| 7 collections (i = 7) | $<1,1,1,1,1,4,9;18>$ |
| 8 collections (i = 8) | $<1,1,1,1,1,4,9,36;>$ |

These bounds have been exemplified in FIGS. 4–11 when collections were formed.

To encode, each station is required to keep track of the collection to which the prefix of its candidate message belongs. For the previous example with $L=8$ lines, the successive prefixes of the candidate message 1010001010 are (FIGS. 4–11):
member 2 of pool $P_2$,
member 0 of collection $C_{23}$,
member 0 of collection $C_{24}$,
member 0 of collection $C_{35}$,
member 0 of collection $C_{36}$,
member 0 of collection $C_{37}$,
member 3 of pool $P_8$,
member 7 of collection $C_{79}$, and
member 7 of collection $C_7$.

When there are more than L intended messages, it is possible that a station may be forced to drop its message during the process. The transmission of the message may be re-attempted in the next or later message frame.

By way of reiteration, at each stage of the process, the system is defined by a status vector $<a_0, a_1, \ldots, a_{i-1}; b_i>$, i being the number of collections $0 \leq i \leq L$, the collection identifier is j, $0 \leq j \leq i$ and the membership number is m, $0 \leq m \leq a_j$. (Note the convention that when $j = i$, this means the message belongs to the pool).

Initialization

Before the bit interval $\log_2 L$ starts, $i = 0$, $j = 0$ and m equals the binary value of the $(\log_2 L - 1)$ bit prefix of the message.

A bit $b = 0$ or 1 is to be revealed by each station during the succeeding transmission intervals and each is processed according to the following algorithm, which is subdivided into a number of cases (exceptional rules for the situation where $L=4$ for the final bit interval of the opening phase are listed in Appendix A):

Case A.    $0 < i \leq \frac{L}{2}$

Accordingly $0 \leq j < i$, which means there is no pool.
WRITE: logic 1 on line $(2j+b)$
READ: let $p_0, p_1, \ldots, p_{n-1}$, in increasing order, be those lines
that have a logic 1
($p_0 < p_1 < \ldots < p_{p-1}$). Further,
let $p_k$ be the line just written
on by the station.
UPDATE: $i \leftarrow n$ (Note it is guaranteed that $n \leq L$ in this case).

-continued

```
                        j ← k
                        m ← 0
Case B.         i=j (including the case i=0
                    and part of the case L/2 <i<L)
                First, divide 2m+b by L−i and obtain the
                    quotient q and remainder r.
        WRITE:  logic 1 on line (i+r)
        READ:   among lines i, i+1, ..., L−1, let
                    p₀, p₁, ..., pₙ₋₁, in increasing order,
                    be those that show logic 1.
                    Further, let pₖ be the line just
                    written on by the station.
        UPDATE: j ← i+k (if j≧L, drop message)
                i ← min (i+n,L)
                m ← q
Case C.         i > L/2 and i>j
        WRITE:  logic 1 on line j if b=1
        READ:   among lines i, i+1, ..., L−1, let
                    p₀, p₁, ..., pₙ₋₁, in increasing order,
                    be those that show a logic 1. In the case
                    that i=L, then n=0 by default.
                    Let line j return the bit b'.
        UPDATE: i ← min (i+n,L);
                if b'>b and i=L, drop the message;
                if b'>b and i<L, then
                    m ← a₀+...+aⱼ₋₁+m,
                    j ← i;
                if b'=b, no change in j and m.
                            Example
        Message '650' (1010001010) is now traced to
        follow its traversal through the encoding process.
        (1) Bit position log₂L = 3 (start of decision process)
            (FIG. 4)
            Prefix = 10.
            Vector = <;4>.
            i=0 (no collections).
            j=0 (this identifies the pool since j=i).
            m=2 (binary value of the prefix 10).
            New bit b=1.
Case B:
            Divide 2m+b=5 by L−i=8, so q=0,r=5.
        WRITE:  logic 1 on line (i+r)=Line 5.
        READ:   Lines 0, 3 and 5 show logic 1, so n=3,
                    p₀=0, p₁=3, p₂=5 and k=2.
        UPDATE: j ← i+k =0+2 = 2
                i ← min (i+n,L) = min (0+3,8)=3
                m ← q=0
        (2) Bit position 4 (FIG. 5)
            Prefix = 101.
            Vector = <1,1,1;0>.
            i=3.
            j=2.
            m=0.
            New bit b=0.
Case A:
        WRITE:  logic 1 on line (2j+b) = Line 4.
        READ:   Lines 0, 2, 4 and 5 show logic 1,
                    so n=4, p₀=0, p₁=2, p₂=4, p₃=5
                    and k=2.
        UPDATE: i ← n=4.
                j ← k=2.
                m ← 0.
        (3) Bit position 5 (FIG. 6)
            Prefix =1010.
            Vector = <1,1,1,1;0>.
            i=4.
            j=2.
            m=0.
            New bit b=0.
Case A:
        WRITE:  logic 1 on line (2j+b) = Line 4.
        READ:   Lines 1, 2, 3, 4 and 6 show logic 1,
                    so n=5, p₀=1, p₁=2, p₂=3, p₃=4,
                    p₄=6 and k=3.
        UPDATE: i ← n=5.
                j ← k=3.
                m ← 0.
        (4) Bit position 6 (FIG. 7)
            Prefix = 10100.
            Vector = <1,1,1,1,1;5>.
                i=5.
                j=3.
                New bit b=0.
Case C:
        WRITE:  no writing since b=0.
        READ:   Lines 5, 6 and 7 all show logic 0,
                    so n=0. Also, b'=0.
        UPDATE: i ← min (5+0,8)=5;
                Since b'=b, no change in m or j.
        (5) Bit position 7 (FIG. 8)
            Prefix = 101000.
            Vector = <1,1,1,1,1;5>
                i=5.
                m=0.
                New bit b=1.
Case C:
        WRITE:  logic 1 on line j = Line 3.
        READ:   Lines 5 and 7 show logic 1, so n=2.
                Also, b'=1.
        UPDATE: i ← min (5+2,8) = 7.
                Since b'=b, no change in j or m.
        (6) Bit position 8 (FIG. 9)
            Prefix = 1010001.
            Vector = <1,1,1,1,1,4,9;18>.
                i=7.
                j=3.
                m=0.
                New bit b=0.
Case C:
        WRITE:  no writing on Line 3 since b=0.
        READ:   Line 7 does not show a logic 1, so n=0.
                Also, b'=1.
        UPDATE: i ← min (7+0,8) = 7.
                Since b'>b and i<L, then
                    m ← a₀+...+aⱼ₋₁+m=3
                    j ← i=7
                (implies prefix is to become a
                    member of the pool).
        (7) Bit position 9 (FIG. 10)
            Prefix = 10100010.
            Vector = <1,1,1,1,1,4,9,36;>.
                i=7.
                j=7.
                m=3.
                New bit b=1.
Case B:
            Divide 2m+b=7 by L−i=1, so q=7, r=0.
        WRITE:  logic 1 on line (i+r) = Line 7.
        READ:   Line 7 shows a logic 1,
                    so n=1; p₀=7, so k=0.
        UPDATE: j ← i+k = 7
                i ← min (i+n,L) = 8
                m ← q = 7.
        (8) Bit position 10 (FIG. 11) (end of opening phase)
            Prefix = 101000101
            Vector = 1,1,1,1,1,4,9,36;>
                i=8.
                j=7.
                m=7.
                New bit b=0.
Case C:
        WRITE:  no writing since b=0.
        READ:   n=0 by default. Also, b'=0.
        UPDATE: i ← min (i+n,L) = min (8,8) = 8.
                Since b'=b, j and m are unchanged.
```

CLOSING PHASE

As indicated earlier, the closing phase requires an additional $\log_2 L - 1$ bit positions to resolve completely the L messages. The general strategy of the closing phase is first presented and then the strategy is applied to the exemplary message frames discussed in the opening phase.

Initially, a sequence $\{c_n\}$ is defined wherein each element of the sequence is given by $$c_n = \lceil a_n/d_n^{log2L-2} \rceil,$$

where $0 \leq n \leq L$ and $d_n$ is an element of another sequence $\{d_n\}$. The sequence $\{d_n\}$ is fixed for each L. For the case of L=8, for example, $d_0=d_1=d_2=d_3=d_4=1$, $d_5=2$, $d_6=3$ and $d_7=6$. (Values of $d_n$ for L a power of 2 are given in the Appendix B). Then the $c_n$ elements for L=8 are given by $c_0=c_1=c_2=c_3=c_4=1$, $c_5=2$, $c_6=3$ and $c_7=6$. (The case L=8 is unusual in that $c_n=d_n$; in general, this relation is not true).

During the first bit interval in the closing phase, the $j^{th}$ collection, $0 \leq j \leq i$, will be partitioned into $c_j$ "equal parts", that is, as equal as possible. Then either $c_j$ lines, or $c_j-1$ lines when i=L or $c_j=1$, are used to check for the existence of messages in these partitioned parts. If a pool exists, it will be divided into as many parts as there are lines remaining and the existence of messages in the resulting parts will be checked by the remaining lines. At the conclusion of this bit interval, there will no longer be a pool and, moreover, the size of collection j becomes bounded by $d_j^{log_2 L-2}$. In each of the remaining $log_2 L-2$ bit intervals, the bound on the size of collection j will be reduced by the factor $d_j$. Each time either $d_j$ or $d_j-1$ lines are used to check parts of collection j.

First Bit in Closing Phase $$\text{Define } e_k = \begin{cases} c_k - 1 & \text{if } c_k = 1 \text{ or } i = L \\ c_k & \text{otherwise.} \end{cases}$$

WRITE': (The prime notation is used to differentiate a WRITE in the closing phase from a WRITE in the opening phase.) If j<i and $e_j>0$, then the integer division of member number m of collection j by $c_j$ is performed to obtain the quotient q and the remainder r. If $r<c_j-1$ or i<L, then a logic 1 is written on line $e_0+\ldots+e_{j-1}+r$. Otherwise, no signal propagation occurs.

If j=i (i.e., the "pool"), then the integer division of member number m of collection j by L− ($e_0+\ldots+e_{j-1}$) is performed to obtain the quotient q and the remainder r. A logic 1 level is then written on line $e_0+\ldots+e_{j-1}+r$.

READ': If j<i, $e_j>0$ and either $r<c_j-1$ or i<L, let lines $p_0, \ldots, p_{gj}-1$ be those among lines $e_0+\ldots+e_{j-1}$ to $e_0+\ldots+e_j-1$ that show a logic 1. Also, let $p_k$ be the line that a given station has just written on in this interval.

If j=i, let $p_0, \ldots, p_{n-1}$ be those among lines $e_0+\ldots+e_i$ to L−1 that show a logic 1. Again, let $p_k$ be the line written on by a given station.

UPDATE': For $0 \leq k < i$, let $f_k=\max(g_k, 1)$. $i \leftarrow \min(f_0+\ldots+f_{i-1}, L)$.

If j<i and $e_j-0$, then $j \leftarrow f_0+\ldots f_{j-1}$ and m is unchanged.

If j<i, $e_j>0$ and either $r<c_j-1$ or i<L, $j \leftarrow f_0+\ldots+f_{j-1}+k$ and $m \leftarrow q$. If it turns out $j \geq L$, the message is dropped.

If j<i, $e_j>0$, $r=c_j-1$ and i=L, the actions depend upon the value $g_j$. If $g_j>0$, the message is dropped; otherwise, for $g_j=0$, $j \leftarrow f_0+\ldots+f_{j-1}$ and $m \leftarrow q$. (If $j \geq L$, the message is dropped.)

If j=i, $j \leftarrow f_0+\ldots f_{i-1}+k$ and $m \leftarrow q$. (If $j \geq L$, the message is dropped).

Subsequent Bit Intervals in Closing Phase

The same WRITE', READ' and UPDATE' actions occur as in the first bit interval of the closing phase, except $c_k$ is replaced by $d_k$ for all k and there is no pool after one bit interval of the closing phase.

Through the closing phase, the bound on the size of collection j shrinks from $a_j$ to 1 in the following sequence:

$$a_j, \min \lceil a_j, d_j^{log2L-2} \rceil, \min \lceil a_j, d_j^{log2L-3} \rceil, \ldots,$$

$$\min \lceil a_j, d_j \rceil, 1.$$

Continuation of Example

At the initiation of the closing phase (FIG. 12), message '650' (1010001010) is in collection $C_7$, and is member number 7.

First Bit of Closing Phase

Since the number of collections at the end of the opening phase is i=8=L, then $e_0=e_1=e_2=e_3=e_4=0$, $e_5=1$, $e_6=2$ and $e_7=5$.

Also, since collection $C_7$ is under consideration, j=7.

WRITE': Since j<i (7<8) and $e_j=e_7=5>0$, the integer division of member number 7 by $c_7=6$ yields quotient q=1, remainder r−1. Since $1=r<c_j-1=5$, a logic 1 is written Line $(e_0+\ldots+e_6+r)$=Line $(0+\ldots+1+2+1)$=Line 4.

READ': Since j<i (7<8), $e_j=e_7=5<0$ and $r=1<c_j-1=5$, lines $e_0+\ldots+e_{j-1}$ to $e_0+\ldots+e_j-1$ are considered. In particular, $e_0+\ldots+e_{j-1}=3$ and $e_0+\ldots+e_j-1=7$, so Lines 3, 4, 5, 6 and 7 are studied to find those having a logic 1. From FIG. 12, under the 'READ' heading, only Line 4 has a logic 1. Thus, $p_0=4$, which means $g_j=g_7=1$. Moreover, k=0.

UPDATE': It can be shown that $f_k=1$ for $0 \leq k < 8$ (e.g., $f_7=\max(g_7, 1)=1$ from READ step), so $i \leftarrow \min(f_0+\ldots+f_{i-1}, L)=\min(8, 8)=8$. Since j<i (7<8) and $e_j=e_7=5<0$ and $r=1<c_j-1=5$, $$j \leftarrow f_0+\ldots+f_6+k=1+\ldots+1+0=7$$

and $$m \leftarrow 1.$$

Next (Last) Bit of Closing Phase

For this interval, $d_k$ replaces $c_k$ (for L=8, these are equal). At the start of this interval, i=8, j=7 and m=1 (FIG. 13). Accordingly, the $c_k$'s remain the same as in first bit of the closing phase.

WRITE': Since j<i (7<8) and $e_j=e_7=5>0$, the integer division of member number 1 by $d_7=6$ yields quotient q=0, remainder r=1. Since $1=r<c_j-1=5$, a logic 1 is written on Line 4.

READ': Since j<i (7<8), $e_j=e_7=5>0$ and $r=1<c_j-1=5$, lines $e_0+\ldots+e_{j-1}$ to $e_0+\ldots+e_j-1$, namely, Lines 3, 4, 5, 6, 7 are monitored to determine which have a logic 1. From FIG. 12, Lines 4 and 6 have a logic 1.

Since this is the last bit interval processed in this frame, the messages associated with Lines 4 and 6 are transmitted messages. However, since only L=8 messages are accepted per each frame, and the messages on Lines 4 and 6 represent the eighth and ninth revealed messages, the message on Line 6, namely, message '386', is dropped. It is true in general that when the number of messages is greater than or equal to L, then at least L messages are revealed by this technique, so the normalized throughput efficiency is at least one.

This example is typical in that more than one message is conveyed by some of the lines (for instance, Lines 0, 1 and 4 each convey two of the eight messages) whereas other lines do not convey any of the messages (Lines 5, 6 and 7 do not provide any successfully transmitted messages); the other two messages are transmitted by Lines 2 and 3. The dynamic allocation process in which all lines are utilized collectively during each bit interval leads to this result.

B. Decoding

During the bit-by-bit encoding process, a transmitting station keeps track of just three numbers for its intended message, namely: the number of collections; the collection identifier; and the membership identifier. However, by monitoring the composite logic level on the channels (e.g., via lines 131-138 of FIG. 1 for station $S_1$) and by computing with a single but universal algorithm known to all the stations, each station actually has the capability to determine the collection and membership identifiers for any intended message. It is this algorithmic capability that enables every station to decode all the successfully transmitted messages.

The manner in which each station manages data for decoding is as follows. Instead of mapping every possible message to the two identifiers (collection and membership), the decoding function maps each eligible pair of the two identifiers to the bit pattern of the message, that is, to its corresponding prefix as the message unfolds. Eventually, there are up to L collections each containing only one message; each message is the one successfully transmitted.

A data structure for the decoding function generally is composed of two tables having an identical format. The two tables serve alternately to store contending prefixes. In each bit interval, each prefix stored in the active table is used to construct 0, 1 or 2 prefixes for the next bit interval. The new prefixes are then stored into the standby table and then the two tables interchange their roles as active and standby tables.

A table comprises $a_0 + \ldots + a_{L-1}$ entries, with every entry containing one activity bit and F data bits. Each entry stores one particular member of one particular collection/pool. Collection 0 occupies the first $a_0$ entries in the table, collection 1 occupies the next $a_1$ entries, and so forth. In general, collection j starts at entry $a_0 + \ldots + a_{j-1}$ regardless its size, which may be different from $a_j$ either when collection j identifies the pool, i.e. when j=1, or when the size of the collection shrinks during the closing phase. At the beginning of the transmission session, the initial pool contains L/2 predetermined members and requires no memory. Thereafter when there is a pool, it is treated as collection i (i<L). This addressing scheme is fixed throughout the transmission session. An 'ON' activity bit of an entry indicates that the entry contains a contending prefix, while an 'OFF' bit indicates that the entry is currently serving only the purpose of padding. To exemplify this, the entry at the address $a_0 + \ldots + a_{j-1} + m$, with j<i and $0 \leq m < a_j$ or with j=i, is regarded as out-of-bound, if m is greater than or equal to the ongoing size of the collection j. Contents of an out-of-bound entry are ignored by the decoding process. On the other hand, if this entry is not out-of-bound but has it activity bit off, that means no contending prefix is the member m of the collection j. The activity bits of every entry is updated in every bit interval except for those out-of-bound entries.

Figure 15:
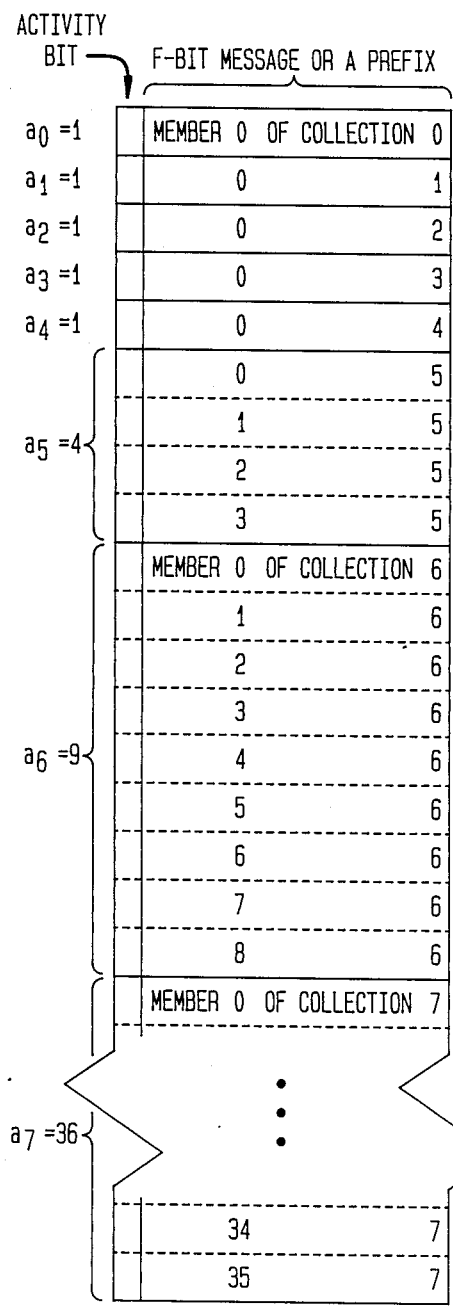
FIG. 15 is the general memory contents for the case of L=8 indicating the positions for storing the prefixes and activity bit as the transmission unfolds.
Figure 16:
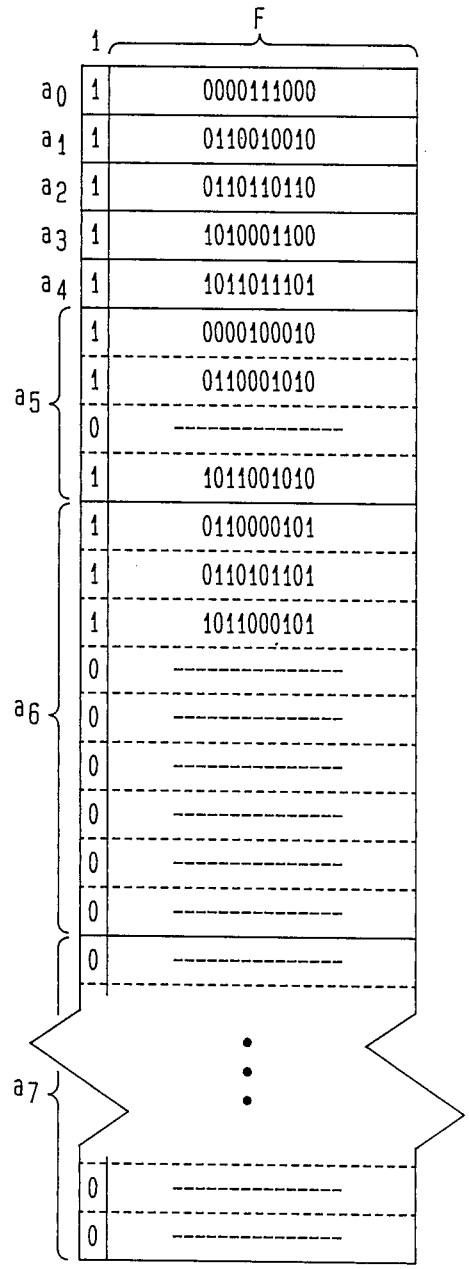
FIG. 16 is a snapshot of the memory layout of FIG. 15 for bit interval 11 of the illustrative example.

The memory layout shown in FIG. 15 depicts the general format for either the active or standby table for the case L=8 in accordance with the above description. The degenerate case existing when there is a pool has not been shown but, illustratively, the pool could occupy the bottom portion of memory layout until all non-pool collections have been identified. In addition, FIG. 16 shows a snapshot of the memory contents of the active table for bit interval 11 of the illustrative example; FIG. 16 corresponds to the candidate messages shown on the left-hand side of FIG. 12.

PROCESS FLOW DIAGRAMS

Figure 17:
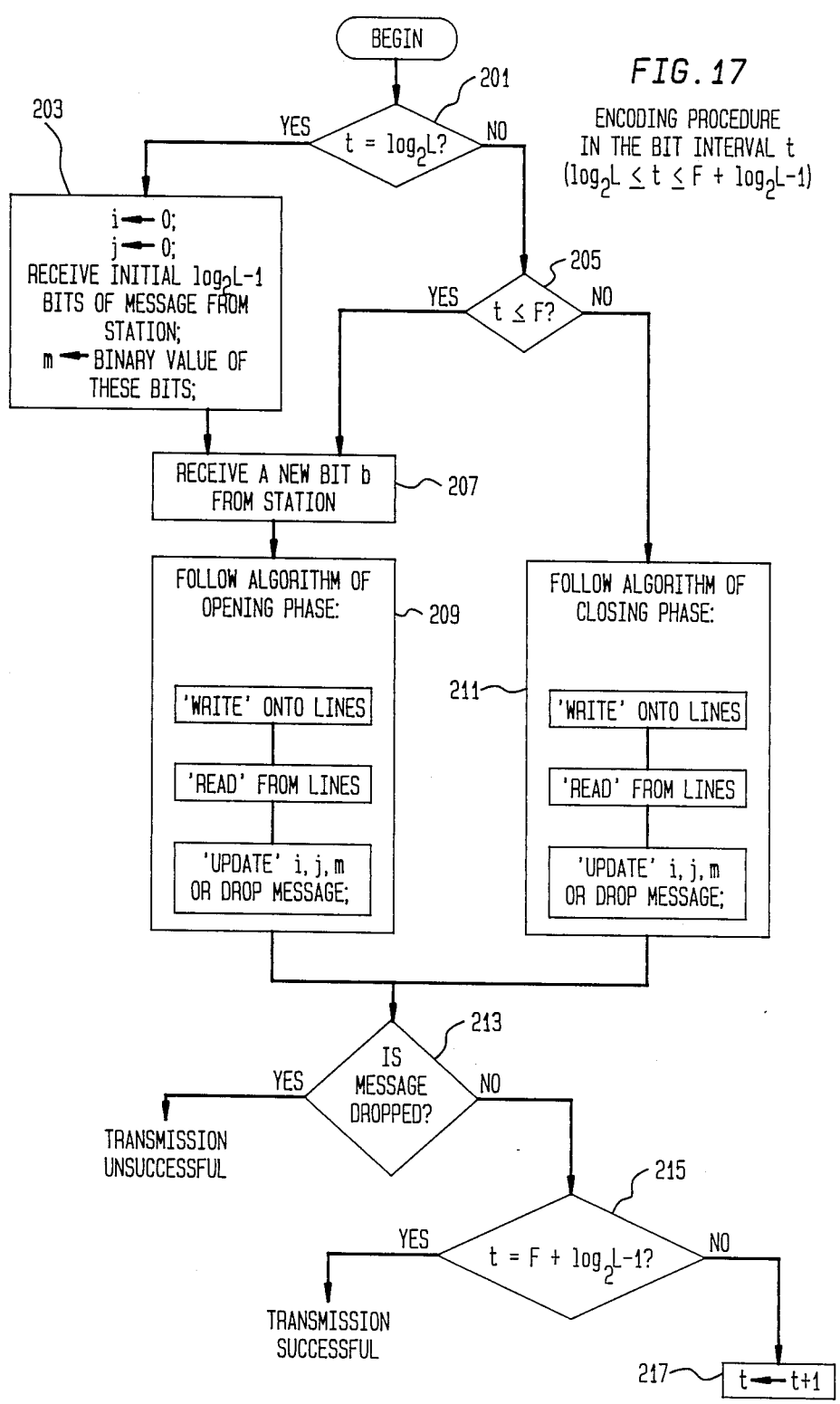
FIG. 17 is a flow diagram showing the processing steps executed by the encoder in accordance with the present invention.

The processing by an encoder embedded in each station in accordance with the present invention is shown in flow diagram form in FIG. 17. In particular, FIG. 17 depicts the processing during any bit interval between $\log_2 L$ and $F + \log_2 L - 1$ bit time positions; this arbitrary interval is designated by t in FIG. 17. The processing begins with decision process 201, which determines the bit position under consideration. If the interval is the first bit in the opening phase for which the lines are to be tested, the steps described by process block 203 are executed. These steps are basically the initialization steps to prepare the parameters i, j and m for the encoding algorithm. If the result of testing by block 201 indicates that bits other than the $\log_2 L$ bit are ready for processing, then decision step 205 is entered. If the encoding algorithm is still in the opening phase, i.e., all bit positions through the F bit position, then the step represented by block 207 is performed. Block 207 is also entered after initialization in block 203. The processing by block 207 causes the next bit in the message to be selected and this next bit serves as input information to the encoding algorithm. Processing block 209 depicts in general form the WRITE (WRITE') [in FIGS. 17-19, both WRITE and WRITE' are designated by 'WRITE', and the appropriate one to use in a given situation is conveyed by the context; similar comments apply to READ and READ' as well as UPDATE and UPDATE', which follow] READ (READ') and UPDATE (UPDATE') algorithmic steps set forth in detail in the discussion of the function theoretic basis. After processing by block 209, the step represented by decision block 213 is performed. This is the point of the process wherein unsuccessful candidate messages are dropped. If the candidate message is not dropped, then decision block 215 tests if both the opening and closing phases have been completed. If both phases are completed, then the transmission is successful. If the process is still in either the opening or closing phases, then the next bit interval is considered. This is depicted by processing block 217 wherein the next bit interval replaces the present interval and processing block 201 is again entered.

Figure 18:
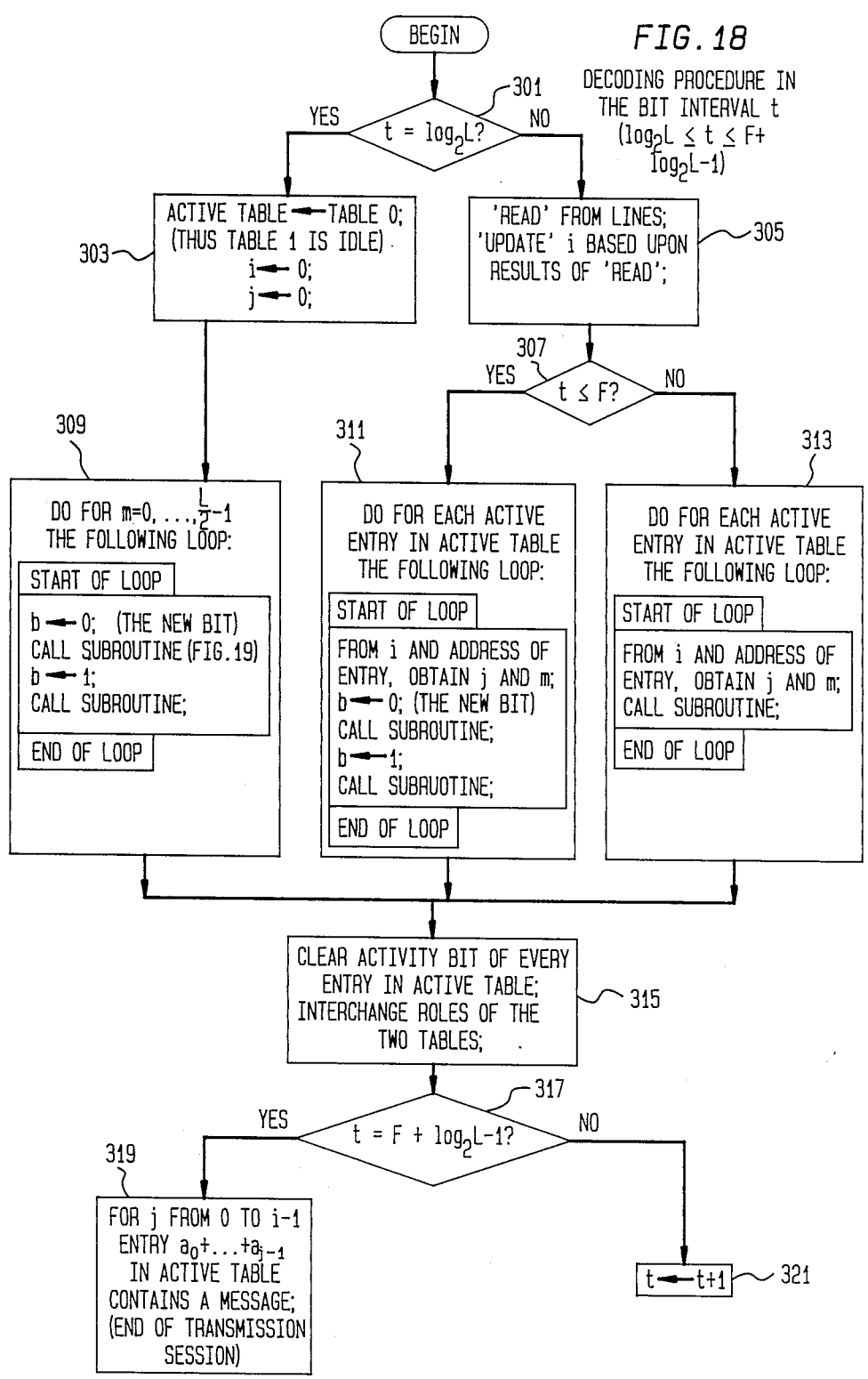
FIGS. 18 and 19 are flow diagrams showing the processing steps executed by the decoder in accordance with the present invention.

With respect to decoding by a given station, FIG. 18 is first considered. Again, the process is described for any bit interval between $\log_2 L$ and $F + \log_2 L - 1$ bit intervals; the particular bit interval is denoted by t. Decision block 301 determines if the bit interval under consideration is the first bit or any of the other bits to be processed. If the first bit is to be processed, there is an initialization phase represented by the steps in processing block 303. The active table is established and both the number of collections i and the collection identifier j are set to zero. After this initialization, processing block 309 is invoked. Basically, a DO loop based on the member number m is executed. The loop ranges from $m=0, 1, \ldots, L/2-1$. In the loop, the two possible values for the next succeeding bit are serially processed by the subroutine shown in flow diagram in FIG. 19, which will be discussed shortly. Upon completion of the loop, the processing represented by block 315 is invoked. Briefly, this processing clears the activity bit of each active table entry (as discussed with reference to FIG. 15) and then interchanges the roles of the active and standby tables. Next, decision block 317 is entered to determine the exact bit interval under consideration. If all bit intervals have been processed, block 319 is invoked to extract the transmitted messages from the then active table. If there are remaining bit intervals to be processed, the bit interval is incremented via block 319 and block 301 is again entered.

The focus is now on the activity after the branch from block 301 to block 305, which occurs for all bit intervals other than the $\log_2 L$ bit for each frame message. Block 305 indicates that a READ (READ') operation is performed on the lines. Each station executes the same encoding algorithm, so each decoder embedded in the station may be coupled to its corresponding encoder and may monitor the results of the encoding process. Thus, each decoder has access to the value of i as it is determined. Based on the READ (READ'), the station may UPDATE (UPDATE') the number of collections parameter i. After the update, decision block 307 is entered to determine if the opening phase or the closing phase is being processed. Assuming initially that the opening phase is active, then processing block 311 is entered. The main processing performed by the steps represented by block 311 is to prepare the appropriate information for subsequent calls to the subroutine depicted in FIG. 19. The processing is represented by a DO loop which ranges over the active table entries. From the number of collections i and the address of the entry, there is sufficient information to obtain the j and m identifiers. For instance, from FIG. 16, if the address selected corresponds to the seventh row of the memory layout, then it is known that the collection identifier $j=5$ and the member number $m=1$. In the loop, the processing is essentially the same as that performed by processing block 309. Moreover, after processing a block 311, the branches available for traversal upon exiting the block are the same options existing upon exiting block 309.

The final processing block in FIG. 18, namely, block 313, is invoked for the bit intervals corresponding to the closing phase. The value of i is known prior to entry into block 313, and a DO loop ranging over the active table entries is again executed. The values for j and m are obtained from the knowledge of i and the memory address information. There is one call to the subroutine of FIG. 19 for each active entry. Block 313 feeds block 315 and the processing then continues as described above.

Figure 19:
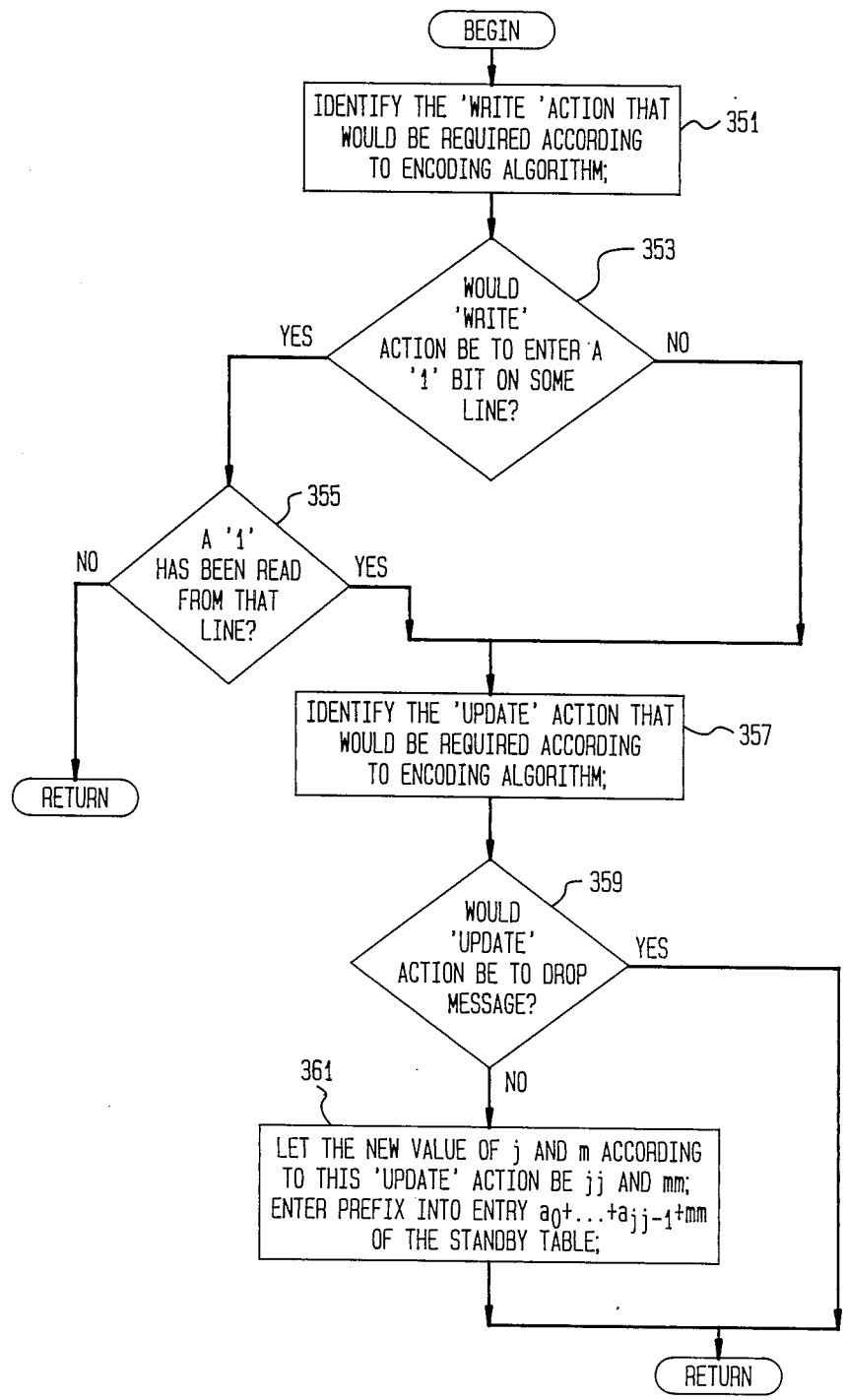

With respect to FIG. 19, the entry point is processing block 351. Using the encoding algorithm, the WRITE (WRITE') action required in either the opening or closing phases, as appropriate, is identified. Once identified, decision block 353 is invoked to determine if a logic 1 is to be propagated on any line. If 'YES', then follow-up decision processing in invoked for that line. In block 355, a determination is made whether a logic 1 is READ (READ') from that line. If not, there is a Return from the subroutine. If so, then processing block 357 is entered; this block is also entered upon a 'NO' response to the processing by the steps of block 353. In block 357, the encoding algorithm is used to identify the UPDATE (UPDATE') action required. Once identified, decision block 359 is entered to determine whether or not the UPDATE (UPDATE') action is to drop the candidated message. If so, there is a Return from the subroutine. If not, then the prefix is entered into the standby table as depicted by the processing of block 361. Upon completion of this processing, there is a normal Return form the processing subroutine.

It is to be understood that the above-described embodiment is simply illustrative of the application of the principles in accordance with the present invention. Other embodiments may be readily devised by those skilled in the art which may embody the principles in spirit and scope in accordance with the claims.

APPENDIX A

Exceptional Rules When $L=4$ for the

Final Bit in the Opening Phase

At the end of the next-to-last bit interval in the opening phase, if the status vector is either $<1,1,1;3>$ or $<1,1,1;6>$, then the status vector in the last bit interval may possibly become $<1,1,1,6>$ following the regular rules. It is undesirable to have the $<1,1,1;6>$ vector at the end of the opening phase because the closing phase may not be capable of determining the proper messages. Therefore, special rules are designed to change the above situation into

---

$$<1,1,1;3> \rightarrow <1,1,1;4>$$
$$\text{or} \rightarrow <1,1,1;5>$$
$$\text{and } <1,1,1;6> \rightarrow <1,1,1;4>.$$

Then all regular rules apply except for the following:
If $i = 3$, $j = 3$ and $m = 5$, then no write occurs. If Line 3 returns logic 1, drop message. If Line 3 returns logic 0, $j \leftarrow 3$ and $m \leftarrow 3$.
If $i = 4$, $j = 2$, then no write occurs; moreover i and j are unchanged.
If $i = 4$, $j = 3$:
WRITE: Divide m by 3 and obtain quotient q and remainder r.
If $r = 0$, write logic 1 on line 2.
If $r = 1$, write logic 1 on Line 3.
<u>READ and UPDATE:</u>
If Line 2 shows logic 1, and
if $r = 0$, $j \leftarrow 3$ and $m \leftarrow q$.
If $r = 1$ or 2, drop message.
If Line 2 shows logic 0 and Line 3 shows logic 1,
and if $r = 1$, $j \leftarrow 3$ and $m \leftarrow q$.
If $r = 2$, drop message.
If both Lines 2 and 3 show logic 0, then $r = 2$ and $j \leftarrow 3$ and $m \leftarrow q$.
<u>SPECIAL VALUE of $a_2$.</u>
Set $a_2 = 2$ instead of 1.

---

APPENDIX B

Definition of $\{d_n\}$, $0 \leq n \leq L$ for a power of 2.

$L=4$ case:

-continued n = 0-2, 3
$d_n$ = 1   4

L=8 case:
n = 0-4, 5, 6, 7
$d_n$ = 1   2   3   6

L=16 case:
n = 0-8, 9-11, 12-13, 14, 15
$d_n$ = 1   2   3   4   7

L=32 case:
n = 0-19, 20-24, 25-27, 28-29, 30, 31
$d_n$ = 1   2   3   4   5   7

L=64 case:
n = 0-37, 38-55, 56-58, 59-60, 61, 62, 63
$d_n$ = 1   2   3   4   5   6   7

L=128 case:
n = 0-74, 75-113, 114-127
$d_n$ = 1, 2, $\lceil a_n^{1/6} \rceil$

L=256 case:
n = 0-148, 149-227, 228-255
$d_n$ = 1, 2, $\lceil a_n^{1/7} \rceil$

L≧512 case:
n = 0 to X, X+1 to L−1
$d_n$ = 1, $\lceil a_n^{1/(\log_2 L - 1)} \rceil$ $$\text{where } x = \max\left[\left(\sum_{i=L/2+1}^{L-2} \lceil a_n^{1/(\log_2 L - 1)} \rceil, L\right)/2\right]$$

What is claimed is:

1. A method for transmitting a multiplicity of messages over a plurality of OR-type lines interconnecting numerous synchronized stations, wherein each message is prepared by a corresponding station and is partitioned into a number of bit intervals, and wherein an OR-type line is such that one or more logic one bits transmitted over the line by the stations produces a composite logic one level on the line whereas the composite level is logic zero otherwise, the method for any arbitrary bit interval comprising the steps of identifying message candidates corresponding to the messages and assigning each of said candidates to selected ones of the lines, propagating a logic signal from each of the stations as determined by its bit value in the arbitrary interval over a corresponding one of the lines, and sensing by each of the stations a composite logic signal propagated on each of the lines to generate subsequent message candidates for indentification in the succeeding bit interval, wherein said subsequent candidates determined for the last of the message bit intervals yield successfully transmitted messages.

2. A method for communicating a plurality of message frames among synchronized stations interconnected by a parallel arrangement of OR-type lines, wherein an individual frame is generated by a corresponding station and is partitioned into a number of bit intervals, and wherein an OR-type line is such that one or more logic one bits transmitted over the line by the stations produces a composite logic one level on the line whereas the composite level is logic zero otherwise, the method for each given bit in a frame comprising the steps of identifying within each of the stations a set of prefixes, corresponding to the frame messages, as determined by a prescribed encoding algorithm, associating each of said prefixes with predetermined ones of the lines using said algorithm, emitting a logic level by each of the stations to a corresponding one of the lines as determined by both the station bit level of the given bit and said algorithm, and detecting within each of the stations the logic level on each of the lines so as to provide input information to said algorithm and produce new prefixes for identification in the next bit interval, wherein the prefixes remaining upon completion of processing of all the bit intervals in one of the frames yield at least some of the messages.

3. A method for communicating among synchronized stations interconnected by a plurality of OR-type lines messages generated by the stations, wherein one message per station is produced and each message is partitioned into a number of bit intervals, and wherein an OR-type line is such that one or more logic one bits transmitted over the line by the stations produces a composite logic one level on the line whereas the composite level is logic zero otherwise, the method for each given bit interval comprising the steps of identifying collections of candidate messages wherein said collections are generated by a predetermined encoding algorithm, assigning each of said collections to prescribed ones of the lines using said algorithm, applying a signal level by each of the stations to a corresponding one of said assigned lines as determined by said algorithm, monitoring a signal response on each of the lines by each of the stations so as to provide input information to said algorithm, and generating new collections using said information and said algorithm for identification in the succeeding bit interval, wherein the new collections produced after all bit intervals are processed contains successfully communicated ones of the messages.

4. The method as recited in claim 3 wherein the number of lines is L and the number or bit intervals is F and wherein said algorithm includes an opening phase encompassing the F bit intervals, said opening phase executed in each of the stations and comprising an initialization phase completed by the ($\log_2 L - 1$)-bit interval wherein the number of said collections, a collection identifier and a collection member number m are initialized, and for each of the bit intervals from $\log_2 L$ to F, a sequence of WRITE, READ and UPDATE steps according to said algorithm for determining new values for the number of said collections, said collection identifier and said member number and thereby to identify said collections of said candidate messages and to assign said each of said collections to said prescribed ones of the lines, and wherein said step of applying a signal level includes said WRITE step, said step of monitoring each of the lines includes said READ step, and said step of generating new collections includes said UPDATE step.

5. The method as recited in claim 4 wherein the number of said collections is i, said collection identifier is j and said member number is m, and wherein said WRITE, READ and UPDATE steps are divided into three cases for $L>4$ depending on the i and j values and their relationship to each other, said three cases summarized as follows with b equal to the 0 or 1 value of the bit in the given interval:

| | |
|---|---|
| Case A. | $0<i\leq \frac{L}{2}$ |
| WRITE: | logic 1 on line $(2j+b)$ |
| READ: | let $p_0, p_1, \ldots, p_{n-1}$, in increasing order, be those lines that have a logic 1 $(p_0<p_1<\ldots<p_{n-1})$; further, let $p_k$ be the line just written on by the station |
| UPDATE: | $i \leftarrow n$ |
| | $j \leftarrow n$ |
| | $m \leftarrow 0$ |
| Case B. | $i=j$ |
| | First, divide $2m+b$ by $L-i$ and obtain the quotient q and remainder r |
| WRITE: | logic 1 on line $(i+r)$ |
| READ: | among lines $i, i+1, \ldots, L-1$, let $p_0, p_1, \ldots, p_{n-1}$, in increasing order, be those that show logic 1; further, let $p_k$ be the line just written on by the station |
| UPDATE: | $j \leftarrow i+k$ (if $j>L$, drop message) |
| | $i \leftarrow \min(i+n,L)$ |
| | $m \leftarrow q$ |
| Case C. | $i>\frac{L}{2}$ and $i>j$ |
| WRITE: | logic 1 on line j if $b=1$ |
| READ: | among lines $i, i+1, \ldots, L-1$, let $p_0, p_1, \ldots, p_{n-1}$, in increasing order, be those that show a logic 1; in the case that $i=L$, then $n=0$ by default; let line j return the bit b, |
| UPDATE: | $i \leftarrow \min(i+n,L)$; |
| | if $b'>b$ and $i=L$, drop the message; |
| | if $b'>b$ and $i<L$, then |
| | $m \leftarrow a_0+\ldots+a_{j-1}+m$, |
| | $j \leftarrow i$; |
| | if $b'=b$, no change in j and m. |

6. The method as recited in claim 4 wherein said algorithm includes a closing phase encompassing an additional $\log_2 L - 1$ bit intervals, said closing phase executed in each of the stations and comprising:

for each of the $(F+\log_2 L-1)$-bit intervals, a sequence of WRITE', READ' and UPDATE' steps for determining new values for the number of said collections, said collection identifier and said member number and thereby to identify said collections of said candidate messages and to assign said each of said collections to said prescribed ones of the lines, and wherein said step of applying a signal level includes said WRITE' step, said step of monitoring each of the lines includes said READ' step and said step of generating new collections includes said UPDATE' step.

7. The method as recited in claim 6 wherein the number of said collections is i, said collection identifier is j and said member number is m and wherein said WRITE', READ' and UPDATE' steps are executed in the closing phase as follows:

First Bit in Closing Phase:

Define $e_k = \begin{cases} c_k - 1 & \text{if } c_k = 1 \text{ or } i = L \\ c_k & \text{otherwise,} \end{cases}$ where $c_k$ are given constants

WRITE':

If $j<i$ and $e_j>0$, then the integer division of member number m of collection j by $c_j$ is performed to obtain the quotient q and the remainder r; if $r<c_j-1$ or $i<L$, then a logic 1 is written on line $e_0+\ldots+e_{j-1}+r$; otherwise, no signal propagation occurs If $j=i$, then the integer division of member number m of collection j by $L-(e_0+\ldots+e_{j-1})$ is performed to obtain the quotient q and the remainder r; a logic 1 level is then written on line $e_0+\ldots+e_{j-1}+r$

READ':

If $j<i$, $e_j>0$ and either $r<c_j-1$ or $i<L$, let lines $p_0, \ldots, p_{g_j-1}$ be those among lines $e_0+\ldots+e_{j-1}$ to $e_0+\ldots+e_j-1$ that show a logic 1; also, let $p_k$ be the line that a given station has just written on in this interval If $j=i$, let $p_0, \ldots, p_{n-1}$ be those among lines $e_0+\ldots+e_i$ to $L-1$ that show a logic 1; again, let $p_k$ be the line written on by a given station

UPDATE':

For $0<k<i$, let $f_k=\max(g_k, 1)$ and $i \leftarrow \min(f_0+\ldots+f_{i-1}, L)$ If $j<i$ and $e_j=0$, then $j \leftarrow f_0+\ldots f_{j-1}$ and m is unchanged If $j<i$, $e_j>0$ and either $r<c_j-1$ or $i<L$, $j \leftarrow f_0+\ldots+f_{j-1}+k$ and $m \leftarrow q$; if it turns out $j \geq L$, the message is dropped If $j<i$, $e_j>0$, $r=c_j-1$ and $i=L$, the actions depend upon the value $g_j$; if $g_j>0$, the message is dropped; otherwise, for $g_j=0$, $j \leftarrow f_0+\ldots+f_{j-1}$ and $m \leftarrow q$ (if $j \geq L$, the message is dropped)

If $j=i$, $j \leftarrow f_0+\ldots f_{i-1}+k$ and $m \leftarrow q$; (if $j \geq L$, the message is dropped Subsequent Bit Intervals in Closing Phase:

The same WRITE', READ' and UPDATE' actions occur as in the first bit interval of the closing phase, except $d_k$ replaces $c_k$ where $d_k$ are given constants.

8. A method for interchanging messages among synchronized stations interconnected by a plurality of OR-type lines, wherein one message is produced per station and each message is partitioned into a number of bit intervals, and wherein an OR-type line is such that one or more logic one bits transmitted over the line by the stations produces a composite logic one level on the line whereas the composite level is logic zero otherwise, the method comprising the steps of (a) an initialization step wherein initial collections of candidate messages are generated using a predetermined encoding algorithm, (b) assigning each of said collections to prescribed ones of the lines using said algorithm, (c) applying a signal level by each of the stations to a corresponding one of said assigned lines as determined by said algorithm, (d) monitoring each of the lines by each of the stations so as to provide input information to said algorithm, (e) generating new collections using said information and said algorithm, and (f) repeating steps (b)–(e) for all of the bit intervals, wherein the collections determined by step (e) after all bit intervals are processed contain successfully interchanged ones of the messages.

9. The method as recited in claim 8 wherein the number of lines is L and the number of bit intervals per message is F and wherein said algorithm includes and opening phase encompassing the F successive bit intervals and a closing phase encompassing the next $\log_2 L - 1$ bit positions, said opening phase executed in each of the stations and comprising:
said initialization step further including an initialization stage completed by the ($\log_2 L - 1$)-bit interval wherein the number of collections, a collection identifier and a collection member number m are initialized; and for each of the bit intervals within the range $\log_2 L$ to F, a sequence of WRITE, READ and UPDATE steps for determining new values for the number of collections, said collection identifier and said member number and thereby to generate said new collections and to assign said each of said collections to said prescribed ones of the lines, and wherein said step (c) includes said WRITE step, said step (d) includes said READ step and said step (e) includes said UPDATE step, and said closing phase executed in each of the stations and comprising, for each of the bit intervals in the range (F+1) to (F+$\log_2 L - 1$), a sequence of WRITE', READ' and UPDATE' steps for determining new values for the number of said collections, said collection identifier and said member number and thereby to generate said new collections and to assign said each of said collections to said prescribed ones of the lines, and wherein said step (c) includes said WRITE' step, said step (d) includes said READ' step and said step (e) includes said UPDATE' step.

10. A method for communicating among synchronized stations messages emitted by the stations, the messages being partitioned into a number of bit intervals, the method comprising the steps of interconnecting the stations with a plurality of OR-type lines, wherein an OR-type line is such that one or more logic one bits transmitted over the line by the stations produces a composite logic one level on the line whereas the composite level is logic zero otherwise, and for each given bit interval
selecting collections derived according to a prescribed algorithm, each of said collections defining candidate messages, associating each of said collections with a subset of said lines, conveying a signal level by each of the stations over a corresponding one of said assigned lines, said signal level determined by the value of the bit in said given interval emitted by said each of said stations, and monitoring each of the lines by each of said stations to provide input information to said algorithm for generating the next collections associated with the succeeding bit interval.

11. A method for transmitting a multiplicity of messages over a plurality of OR-type lines interconnecting numerous synchronized stations, wherein each message is prepared by a corresponding station and is partitioned into a number of bits occupying bit intervals, and wherein an OR-type line is such that one or more logic one bits transmitted over the line by the stations produces a composite logic one level on the line whereas the composite level is logic zero otherwise, the method for any arbitrary bit interval comprising the steps of identifying initial collections of message candidates in correspondence to the binary values of the station messages as determined by the bits in the bit intervals up to the arbitrary bit interval, assigning each of said collections to selected ones of the lines, propagating a logic signal from each station over a corresponding one of the lines assigned to one of said initial collections containing the corresponding one of the station messages, said logic signal determined by the bit in the arbitrary interval for said each station whenever the arbitrary interval is less than a predetermined value and by a predefined encoding algorithm whenever the arbitrary interval exceeds said predetermined value, and sensing by each of the stations the composite logic level on each of the lines to determine updated collections of message candidates such that each of said updated collections contains at least one of the station messages, wherein said subsequent candidates determined for the last of the message bit intervals yield successfully transmitted messages.

* * * * *

UNITED STATES PATENT AND TRADEMARK OFFICE
CERTIFICATE OF CORRECTION

PATENT NO. : 4,852,091

DATED : July 25, 1989

INVENTOR(S) : Shuo-Yen Robert Li

It is certified that error appears in the above-identified patent and that said Letters Patent is hereby corrected as shown below:

Column 5, line 27, change "1 650'" to --'650'--;

Column 5, line 61, change "'650' of" to --'650 and '652' of--.

Column 7, line 63, change "$<a_0,...,a_{1-1}; a_0+...+a_{i-1}>.$" to --$<a_0,a_1,...,a_{i-1}; a_0+...+a_{i-1}>.$--.

Column 8, line 66, change "$(p_0<p_1<...<p_{p-1}).$" to --$(p_0<_1<...<p_{n-1}).$--;

Column 10, between line 3, "j=3." and line 4, "New bit b=0.", insert --m=0.--;

Column 10, line 48, change "Vector = 1,1,1,1,1,4,9,36;>" to --Vector = $<1,1,1,1,1,4,9,36;>$--.

Column 11, line 58, change "$e_j$-0" to --$e_j=0$--;

Column 11, line 67, change "$f_{-1}+k$" to --$f_{i-1}+k$--.

Column 12, line 32, change "remainder r-1." to --remainder r=1.--.

Column 17, line 58, change "indentification" to --identification--.

UNITED STATES PATENT AND TRADEMARK OFFICE
CERTIFICATE OF CORRECTION

PATENT NO. : 4,852,091

DATED : July 25, 1989

INVENTOR(S) : Shuo-Yen Robert Li

It is certified that error appears in the above-identified patent and that said Letters Patent is hereby corrected as shown below:

Column 18, line 51, change "number or" to --number of --.

Signed and Sealed this

Sixth Day of October, 1992

Attest:

DOUGLAS B. COMER

*Attesting Officer*  *Acting Commissioner of Patents and Trademarks*